US006700352B1

(12) United States Patent
Elliott et al.

(10) Patent No.: US 6,700,352 B1
(45) Date of Patent: Mar. 2, 2004

(54) DUAL CAPACITOR/BATTERY CHARGER (75) Inventors: Stephen Elliott, Bradenton, FL (US); Robert Mylott, Bradenton, FL (US)

(73) Assignee: Radiant Power Corp., Palmetto, FL (US)

( * ) Notice: Subject to any disclaimer, the term of this patent is extended or adjusted under 35 U.S.C. 154(b) by 0 days.

(21) Appl. No.: 09/710,020

(22) Filed: Nov. 10, 2000

Related U.S. Application Data (60) Provisional application No. 60/164,982, filed on Nov. 11, 1999.

(51) Int. Cl.[7] .................................................. H02J 7/00
(52) U.S. Cl. ....................................... 320/130; 320/131
(58) Field of Search ................................. 320/130, 131, 320/137, 149, 160, 167, 128, 106; 324/425, 426

(56) References Cited

U.S. PATENT DOCUMENTS

| | | | |
|---|---|---|---|
| 4,232,260 A | 11/1980 | Lambkin | 320/2 |
| 5,355,073 A | 10/1994 | Nguyen | 320/15 |
| 5,372,898 A | 12/1994 | Atwater et al. | 429/90 |
| 5,440,221 A | 8/1995 | Landau et al. | 320/22 |
| 5,479,084 A | 12/1995 | Satsuma et al. | 320/13 |
| 5,596,258 A | 1/1997 | Kimura et al. | 320/2 |
| 5,686,808 A | 11/1997 | Lutz | 320/2 |
| 5,744,937 A | 4/1998 | Cheon | 320/125 |
| 5,789,903 A | 8/1998 | Young et al. | 320/161 |
| 5,793,188 A | 8/1998 | Cimbal et al. | 320/130 |
| 5,912,544 A | 6/1999 | Miyakawa et al. | 320/106 |
| 5,986,433 A * | 11/1999 | Peele et al. | 320/125 |
| 6,337,557 B1 | 1/2002 | Kates et al. | 320/112 |

FOREIGN PATENT DOCUMENTS

| | | | |
|---|---|---|---|
| DE | 3 831 281 | 3/1990 | H02J/7/00 |
| DE | 195 17 117 | 11/1996 | H02J/7/00 |
| EP | 0298556 A1 | 1/1989 | |
| EP | 0818869 | 1/1998 | H02J/7/00 |
| JP | 2001126776 A | 5/2001 | |
| WO | 95/26066 | 9/1995 | H02J/7/10 |
| WO | 97/32383 | 9/1997 | H02J/7/00 |
| WO | 00/77918 | 12/2000 | H02M/7/53 |

OTHER PUBLICATIONS

Partial European Search Report dated Dec. 16, 2002 for EP Application Ser. No. 02250862.6.
Z. Takehara, "Future Trends in the Development of Batteries for Telecommunications and Electronic Apparatus" Proceedings of the International Telecommunications Energy Conference, Kyoto, Japan, Nov. 5–8, 1991, pp 1–7.
International Search Report dated Jan. 16, 2003.

* cited by examiner

*Primary Examiner*—Lawrence Luk
(74) *Attorney, Agent, or Firm*—Darby & Darby (57) ABSTRACT

A power charger which charges and provide conditioned power from at least one of a super-capacitor and a secondary battery. The type of energy device is user selectable, such that the user can select super-capacitors because of their much longer charge/discharge life and low-maintenance requirements, while another user can chose secondary batteries because of their higher stored energy, while a third user may select a combination of the two.

21 Claims, 5 Drawing Sheets

Only one of the signals to logic circuit is high.
This could select reference voltage, current
limit value, or other programmable characteristic

DUAL CAPACITOR/BATTERY CHARGER

This application claims the benefit of Provisional Application No. 60/164,982, filed Nov. 11, 1999.

FIELD OF THE INVENTION

The present invention is directed to an electrical charging device that can recharge either or both of secondary batteries or capacitors, and which implements various intelligent charge-discharge methods for automatically preventing the onset of memory effects in NiCd batteries. A power factor correction circuit for use in a power pack is also disclosed.

BACKGROUND OF THE INVENTION

New electro-chemical capacitors ("super-capacitors" or double-layer capacitors) are currently available in sizes that can compete in some applications with small Nickel-Cadmium (NiCd) and Nickel-Metal-Hydride (NiMH) batteries. Secondary (rechargeable) batteries store energy in the dissociation and recombination of particular chemical compounds. Super-capacitors store energy in the electric field of ionic compounds in close proximity. Secondary batteries offer higher energy density than super-capacitors. For example, there exist conventional 2.3V, 100 Farad super-capacitors that are approximately the size of two "AA" batteries. The energy stored in such a super-capacitor is provided by the well-known formula: $pgCV^2/2=100F(2.3V)^2/2=264$ Joules. Standard "AA" NiCd batteries have a rating of 1.2V at 0.6 Ampere-hour, so two "AA" batteries have a total capacity of $2(1.2V)(0.6A\text{-}hr)(3600 \text{ sec/hr})= 5184$ Joules.

However, while conventional batteries have a significantly higher energy storage density, super-capacitors have superior peak current capability. For example, the same super-capacitor discussed previously has a peak current rating of over 20 Amperes while the two-"AA" NiCd pack has a current rating of only 2.4 A. Super-capacitors also have a superior charge-discharge rated life. A typical super-capacitor can be charged and discharged over 100,000 times while the lifetime of a typical NiCd battery is only 500–1000 charge-discharge cycles.

Super-capacitors also do not suffer from the "memory effect" that occurs in NiCd batteries. The memory effect is a well-known characteristic of NiCd batteries in which repeated partial discharges of the battery cause part of the energy in the battery to become inaccessible during discharge. This is a reversible change in the battery and can be corrected by periodically fully-discharging or "deep discharging" the battery. Deep discharges are generally performed by removing the battery from the battery-powered device, discharging the battery, and then recharging it on a dedicated external battery charger. However, this solution is not always practical. Alternatively, deep discharge can be performed by running the powered equipment until the battery is fully discharged. However, this solution is also not suitable in many situations because the battery may die unexpectedly, and thus operation of the powered device will be unreliable. Although battery "lifetime" indicators may provide some warning, they often operate unreliably when there is an existing memory effect which must be countered. In addition, some electronic devices may be damaged as the battery voltage drops towards the end of the deep-discharge cycle.

Another difference between batteries and super-capacitors is the operating voltage range. Batteries have a narrow operating voltage range. For example, 90% of the energy in a NiCd battery is supplied over a voltage range of 1.35 to 1.05V. In a conventional 2.3V super-capacitor, this range is from 2.3V to 0.7V. Thus, batteries are much easier to use in powering systems because the voltage is generally constant and the battery output is about the same at the end of the discharge cycle as at the beginning.

Because of the various technical differences between batteries and super-capacitors, each device must be charged in specific, often incompatible, ways. Thus, hardware designers must select which rechargeable device to use in powering equipment, making tradeoffs between the longer charge/discharge life and low-maintenance requirements of super-capacitors and the higher stored energy density and more constant output voltage of secondary batteries. The selection is important, particularly if the equipment includes a built-in charger.

It is an object of the invention to provide a power charger which charges and provides conditioned power from either or both of a super-capacitor and a secondary battery. The choice of energy device would preferably be at the user's discretion, so that one user could select super-capacitors because of their much longer charge/discharge life and low-maintenance requirements, while another user could choose secondary batteries because of their higher stored energy, while a third user may select a combination of the two.

It is another object of the invention to provide an embedded charging system in which the charger is included as part of a larger system performing some function with the stored energy, and where the charger includes an on-board automatic system for performing periodic deep-discharge maintenance of NiCd batteries to remove the memory effect.

Yet another object of the invention is to provide a charger which automatically detects the storage element type and automatically or manually adjusts the recharging parameters to accommodate the particular storage element.

It is a further object of this invention to provide a "pre-conditioning" element that narrows the apparent charge and discharge voltage range of super-capacitor elements.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1A:
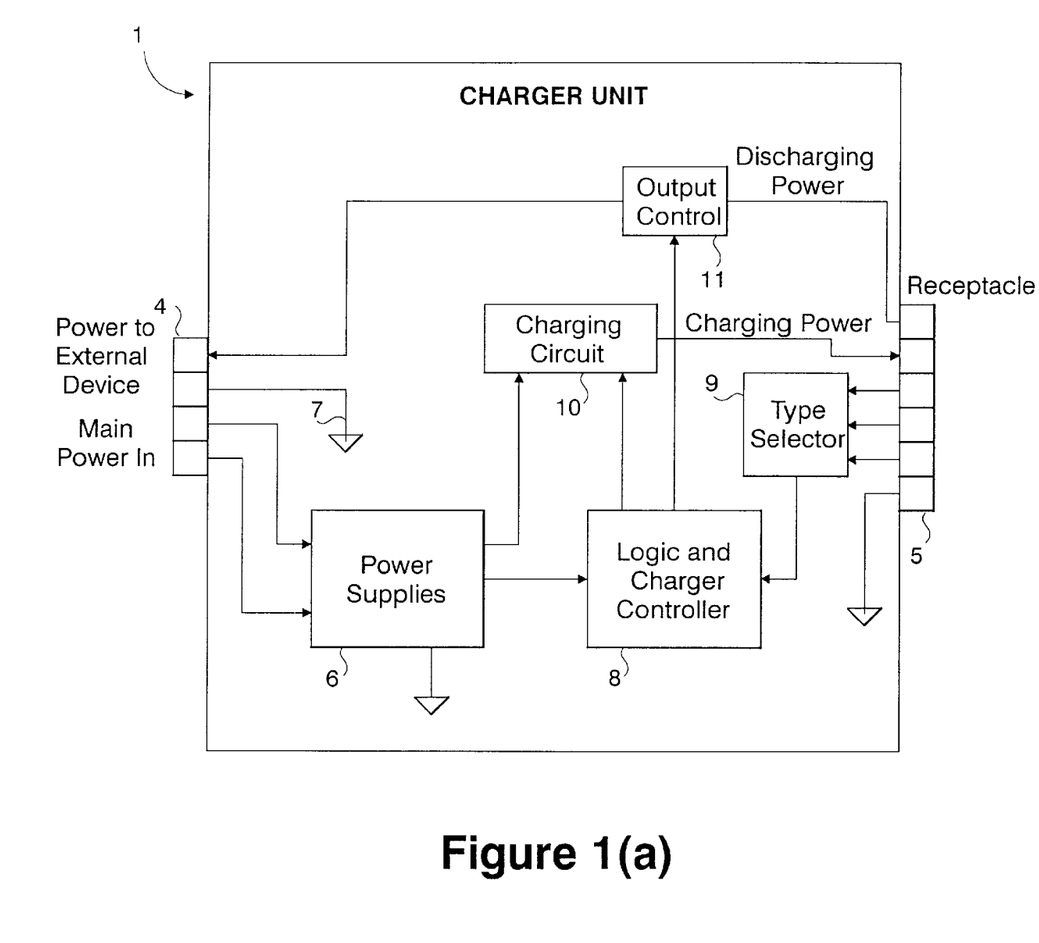
FIG. 1 is a block diagram of a charging system with removable energy packs according to an embodiment of the invention.
Figure 1B:
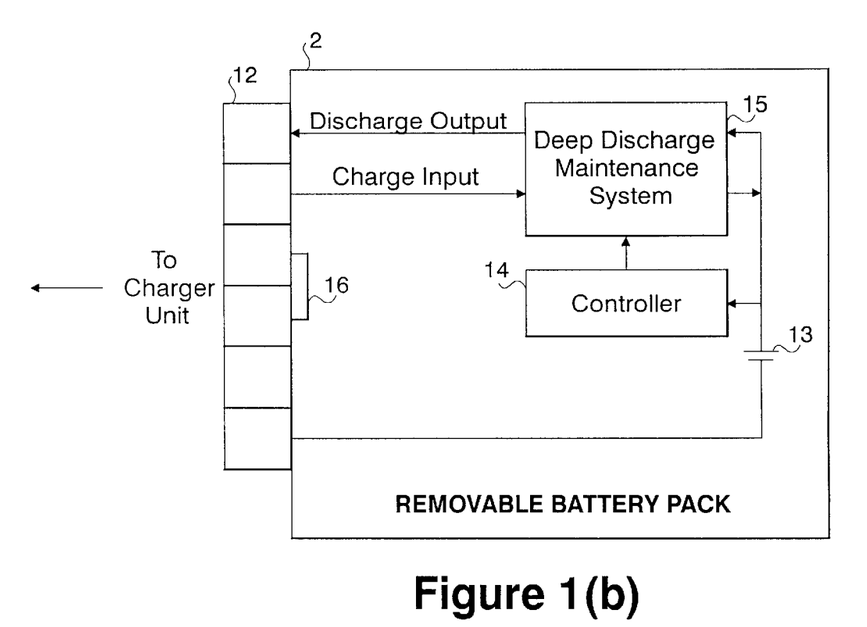
Figure 1C:
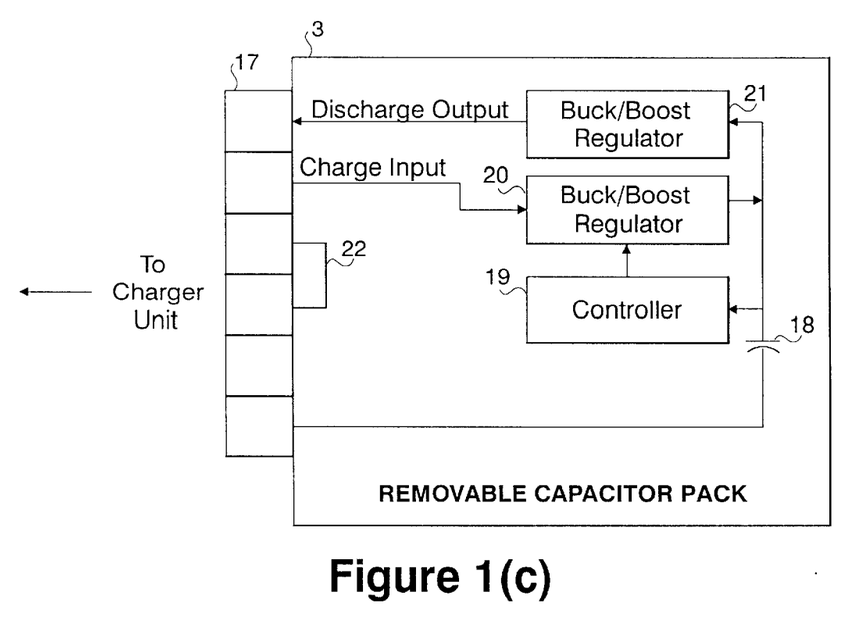
Figure 2A:
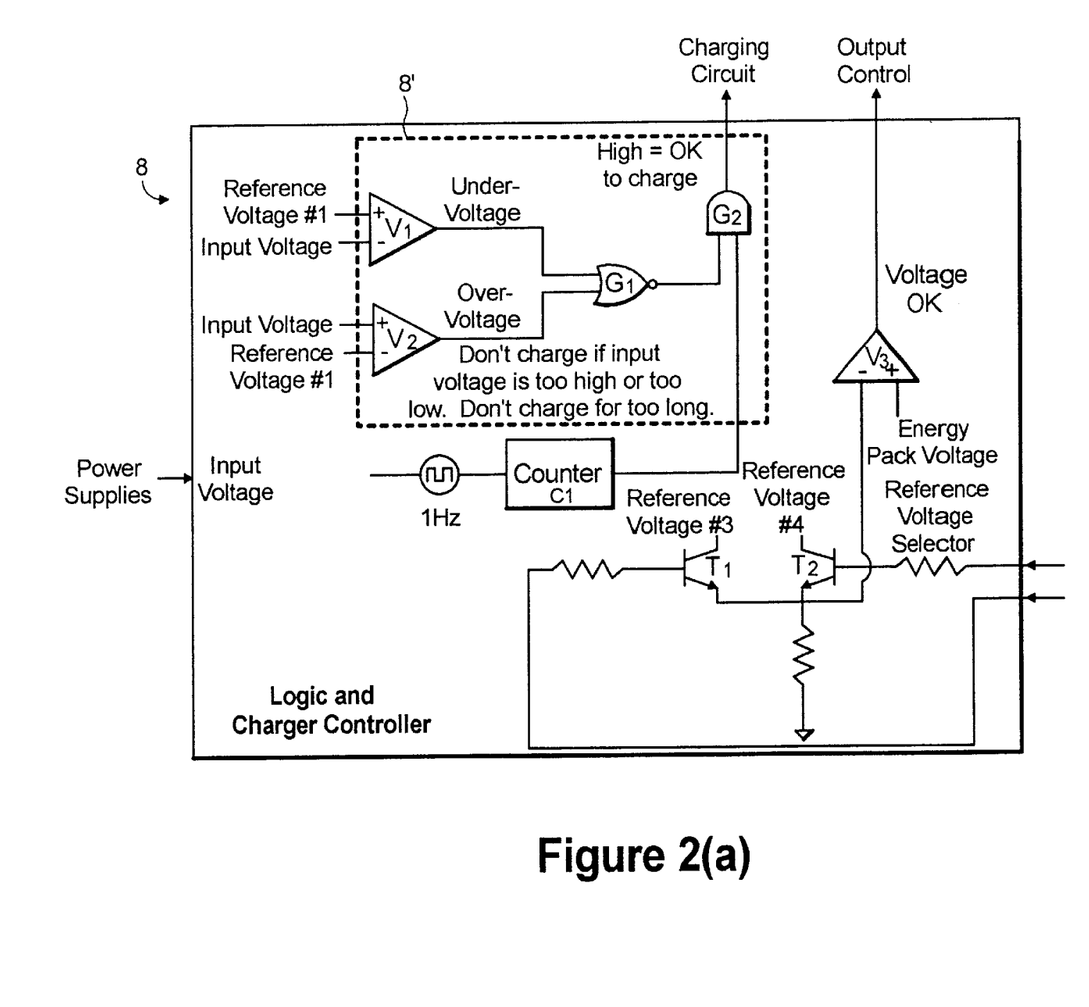
FIG. 2 is an illustration of a particular embodiment of the circuits in the charger unit of FIG. 1.
Figure 2B:
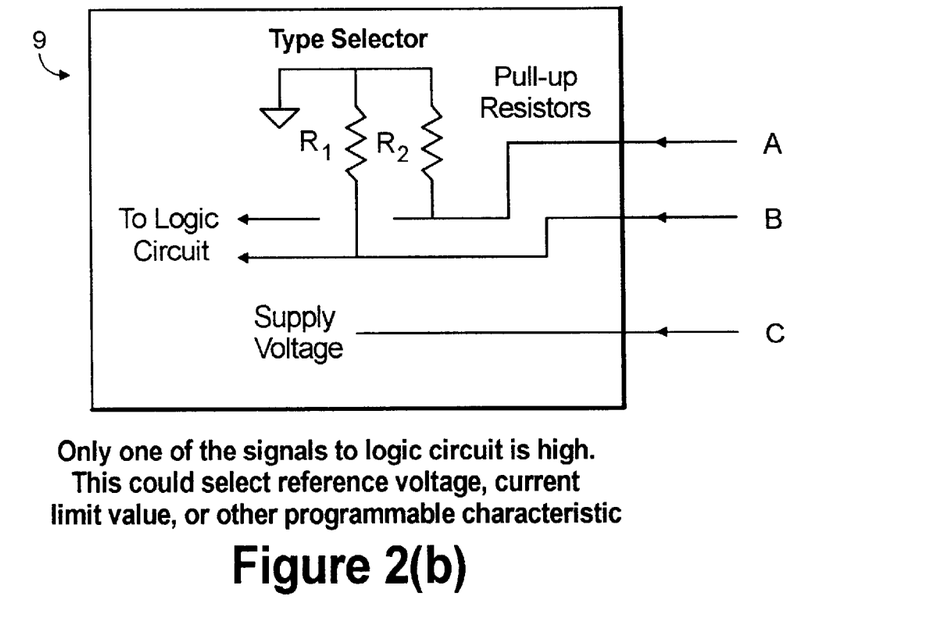
Figure 2C:
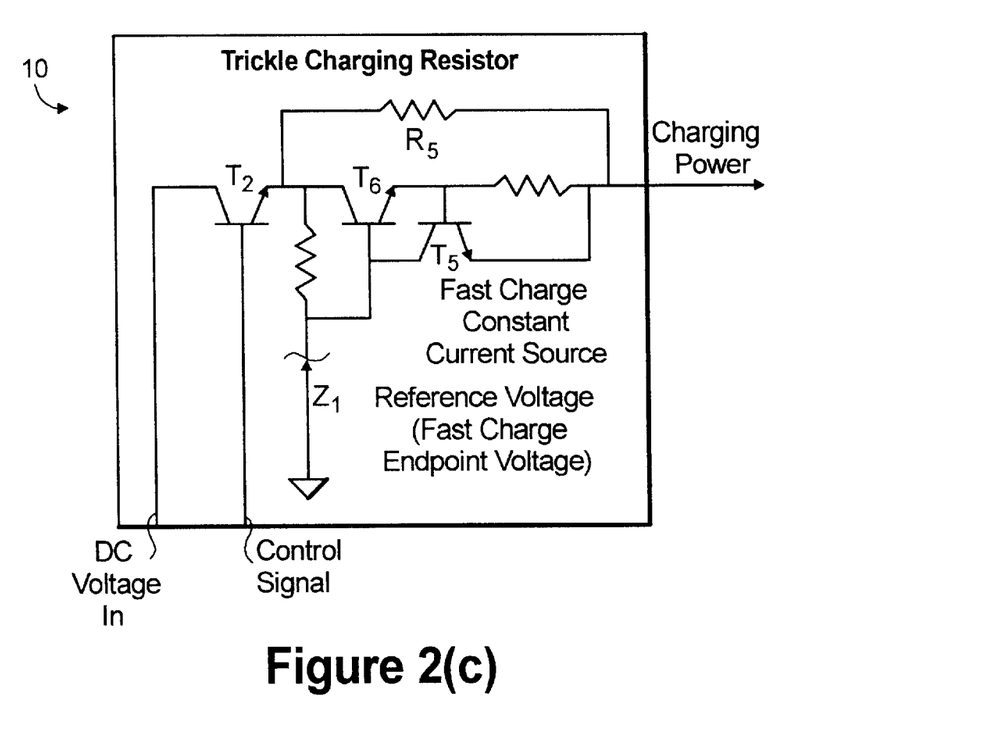
Figure 2D:
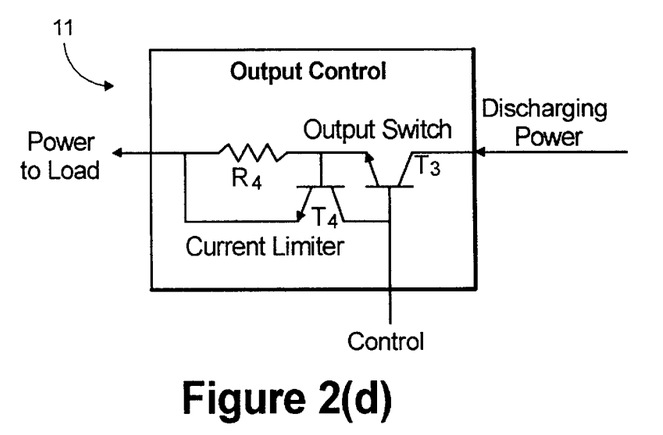

Referring now to FIG. 1, one embodiment of a charging and power system according to the invention comprises Charger Unit, 1 and one or more energy sources, such as a Battery Pack 2, and a Capacitor Pack 3. A particular application may use only the battery pack, only the capacitor pack, either pack, or a combination. Preferably, the battery and capacitor packs 2, 3 are removable and have a respective mating plug 12, 17 which can be connected to a suitable receptacle 5 in the charger unit 1 and which includes appropriate terminals for providing charging current to the energy pack and for extracting stored energy from the pack. Multiple receptacles 5 may be provided in the charger unit for accepting more than one energy source at a time. In such a variant, mixed energy sources may be used. Thus, for example, a user may attach a battery pack 2 and a capacitor pack 3 to the charger unit. As discussed below, the charger is configured to detect which type of energy pack is attached to receptacle 5 and adapt the functionality of the charge and/or discharge circuitry accordingly.

As shown, the Charger unit 1 comprises at least one power supply element 6 that converts input power from external connector 4, into the appropriate voltage levels required to operate the charger unit. The power produced by the power supply element 6, is routed to a logic circuit 8 which controls the basic operation of the actual charging circuitry 10 that in turn provides controlled power (received from the power supply element 6) to recharge the energy pack 2, 3. The logic circuit 8 can also control the operation of the output control 11. Preferably, logic circuit 8 is comprised of hardwired logic elements, either discrete or as part of an integrated structure, such as a programmable logic array. Alternatively, logic circuit 8 may be implemented in programmable devices.

A type selector circuit 9 is also provided. Type selector circuit 9 receives inputs which are used to determine the type of energy storage pack attached to the charger unit. In a preferred embodiment, each class or type of energy storage pack is assigned a unique type identifier, such as one or more type identifier jumpers 16 or 22 placed on terminals of the respective mating plug, 12 or 17 or another physical distinction. When the energy pack is attached to the charger unit 1, the particular combination of open, grounded, and/or jumpered terminals are sensed and used to determine the energy pack type. Alternatively, the type of battery pack connected to charger unit 1 can be determined by using a circuit which senses the charge characteristic of the attached device. In particular, batteries have a relatively constant charge voltage while capacitors increase voltage linearly with increasing charge. In yet a further embodiment, a manual switch can be toggled by the user to identify the type of energy source attached.

A signal indicating the type of energy storage pack that is attached to the charger unit 1 is then provided to the logic circuit 8. In response, logic circuit 8 uses this specific information to control the charging characteristic of the charging circuit 10. Although the logic circuit 8 and type selector circuit 9 are shown as separate elements, this is primarily for ease of understanding. It should be understood that the functionality of the two elements can be combined into a single circuit. The stored energy from the energy pack 2, 3 is routed through output control circuit 11. The output control circuit 11 switches power from the energy storage pack to the external connector 4 upon receiving control signals from the logic circuit 8. The external load is mated to the external connector 4.

Following is a brief description of the functionality of the a preferred embodiment of the Logic and Charger controller 8. The functions can be implemented by discrete logic circuits or via programmable logic.

The Logic circuit and charger controller 8 is the circuit that controls the overall operation of the charger unit 1. It monitors the input power, and when appropriate, enables the charging circuits to recharge the battery or capacitor pack. In the specific application where the energy storage is used for emergency operation (as opposed to the primary power source of a portable device), the controller also enables the energy storage pack to provide power to the load when the input power is absent or invalid. Portable operation can be achieved, in one embodiment, by adding a switching element between the input power supplies and the power connection to the external device. When input power is valid, the controller enables the switching element and the load operates from the input power.

The charging functionality of the controller is implemented by monitoring voltages and currents at the energy pack via the energy pack connections. These connections serve as sense leads as well as power leads. Preferably, the logic and controller 8 and charging circuit 10 have separate charging functions for battery packs and for capacitor packs, which functions are enabled or disabled according to the type of energy pack in use.

A variety of battery charging algorithms may be used, including fast charge with voltage shut-off followed by trickle charge, negative-delta-vee termination, timed fast charge with trickle charge, and negative slope dee-vee-dee-tee. It should be apparent to those skilled in the art that other battery charging schemes could also be implemented in accordance with this invention and that the particular charging method used may vary according to the type of device being charged.

Charging a capacitor pack 3 requires a slightly different scheme. Whereas batteries have a substantially constant voltage characteristic, capacitors have a linear voltage characteristic. To keep from over-heating the charging circuit when the capacitor voltage is very low (large voltage drop across the current source), the charging power is artificially lowered. This is accomplished by either reducing the charging voltage or reducing the charging current. Both methods can be implemented using techniques which are well known to those skilled in the art. One preferred way to reduce the charging power is by pulse-width-modulation of the charging circuit. This pulse-width-modulation lowers the duty cycle and the average power dissipated by the charging circuit. Typically the period of the modulation is 1–5 seconds because the charging circuit usually has a large thermal mass on the heatsink. When the capacitor pack is charged up to the rated voltage, fast charge is terminated and fixed-voltage trickle charge holds the pack at full energy.

In the figure, counter C1 includes a first and a second counter. The first counter is incremented after a discharge and charge of an energy storage pack. Logic circuit 8' is used to monitor the first counter, and is also used to generate an output control signal when the first counter equals a predetermined number. This output control signal is supplied to output control circuit 11.

Using output switch T3 and current limit T4, the output control circuit 11 switches power from the energy storage pack to the external connector 4 (shown in FIG. 1) when the output control signal from the logic circuit is received. In the preferred embodiment, the output switch is a transistor, and the current limiter is a transistor connected in parallel to a resistor R4.

In embodiments of the invention, the logic circuit 8' comprises logic gates G1 and G2, which monitor the output signals of circuits V1 and V2 which are provide a output charging signal based on the difference between reference voltage #1 and the input voltage applied to circuits V1 and V2. When the logic circuit 8' determines that it is possible to charge the energy storage pack, a high level signal (an output charging signal, logic level 1) is provided to charging circuit 10. In an embodiment, the charging circuit 10 comprises a fast charging constant current source T5, a reference voltage (i.e., a Fast Charge Endpoint Voltage comprising Zener Diode Z1 and transistor T6), and a trickle charging resistor R5.

Switch T2 is controlled by the output charging signal. Upon receipt of this signal, which also functions as a charge inhibit signal, the second counter is enabled. After each discharge of the energy storage pack, the second counter is incremented. When a second predetermined number is reached, the discharge circuit 10 further enables charging of the energy storage pack such that deep discharge maintenance on the energy storage pack is performed periodically. In preferred embodiments switch T2 is a transistor.

If the controller is executed using discrete circuitry, the outputs of the selector are used to select appropriate voltage set points or resistor dividers and enable and disable circuit blocks in the logic and charger controller 8. The selector circuit 9 is used to enable or disable the various charging modes by causing different software parameters or modules in the logic and charger controller 8. In embodiments of the invention, selector circuit 9 comprises a plurality of pull-up resistors R1 and R2 which are used to indicated the type of energy pack is attached to the charge 1. Based on the configuration of the terminals which connect the energy pack to the charger unit 1, the selector circuit 9 provides outputs A and B to the logic and charger control circuit 8 for use in determining the type of energy pak in use.

FIG. 2 is an illustration of a particular embodiment of the circuits in the charger unit of FIG. 1. The particular operation of the illustrated circuits will be apparent to those of skill in the art.

According to a further aspect of the invention, the energy packs are configured for use with a charger, such as the charger disclosed above. Returning to FIG. 1, each of the energy storage packs 2 and 3 comprises at least a mating plug 12, 17 and an energy storage device, such as battery 13 or capacitor 18. In addition, and according to a further aspect of the invention, the energy storage pack can be augmented with particular enhancements specific to the type of storage device. Enhancements to the battery pack may be included within the battery pack or within the charger, and generally these functions may be separate from the charger circuitry or included with the charger circuitry. For example, in addition to battery 13, the battery pack 2 can further comprises a controller 14 and a deep discharge maintenance system 15. Similarly, the capacitor pack 3 may include controller 19, and buck/boost regulators 20, 21. Other enhancements include the addition of circuitry to count the number of times the pack has been charged and discharged and, particularly for NiCd batteries, the duration from, or a time stamp of the time that the last deep discharge occurred. Other contemplated enhancements include circuitry to measure the duration from, or a time stamp of the time, the battery was charged (to compensate for self-discharge of the battery), and circuitry to indicate the time in service (to compensate for aging batteries). In addition, circuitry or appropriate memory devices can be included within the pack to store a serial number identification.

Preferably, all of the stored information can be automatically extracted by the charger unit and processed accordingly or passed to an external device. For example, the device serial number can be automatically retrieved to identify the location of power packs which have been recalled due to a newly discovered flaw. Such circuitry could be composed of some or all of the following elements as either discrete circuits or software elements: timers, voltage detecting circuits, counters, logic circuits, and memory elements. Other elements may also be used as will be appreciated by one of skill in the art.

Particular embodiments of the function blocks in the battery pack 2 will now be discussed.

With reference to the block diagram of the battery pack 2 in FIG. 1, there are several ways in which a deep discharge maintenance system 15 may be implemented. In a first embodiment, system 15 comprises a circuit which selectively disables the recharge of the battery in response to an input control signal. In a second embodiment, system 14 comprises a circuit, such as a transistor-based circuit, which discharges the battery into a resistive load upon receipt of an input control signal and which stops the discharge when the battery voltage, as indicated by an internal battery voltage measurement circuit, reaches a predetermined level. The control signal can be provided by the controller 14, discussed below, or a source external to the battery pack 2, such as the charger unit 1.

The functionality of the battery pack controller 14 is dependent on the operation of the deep discharge maintenance system, if there is one, and also upon the intended uses of the battery pack. Potential uses include constant energy applications, such as emergency lighting and backup power for equipment such as emergency recorders and communication systems. One anticipated use is within aircraft emergency systems.

A first controller embodiment is for use primarily when energy consumed by a load is a constant, is known, and is less than a full discharge of the pack. The controller comprises a counter that is incremented after each discharge/charge cycle. A logic circuit monitors the counter and determines when a first predetermined number of cycles have occurred, preferably a number of cycles which are related to when a "memory effect" is likely to occur. If the controller is driving a discharge maintenance system 15 which selectively disables charging of the battery, a second count is started. The second count is updated each time the pack is discharged. Recharging is inhibited during this discharge-inhibit state. When the second count reaches a second predetermined amount, normal recharging resumes. The seconds preset number is selected to permit the normal load cycles of the pack to discharge the pack nearly all the way, preferably including a large safety margin. Thus, periodically, deep discharge maintenance on the pack is performed automatically.

In one embodiment, two separate counters are used. A discharge-inhibit signal is provided to the maintenance system 15 whenever the first count equals the first predetermined number of cycles. This signal also enables the second counter and disables subsequent increments of the first counter. When the second counter reaches the second predetermined level, both counters are reset.

In an alternate implementation, preferably for use when energy consumed by a load is a constant, is generally known, and is less than a full discharge of the pack, a microprocessor or similar digital controller, is configured to provide functionality similar to that discussed above. Advantageously, the use of a microprocessor permits the actual energy consumed by the load to be monitored. The duration of the charge-inhibit state is selected according to the measured energy consumption. In one embodiment, one or several instantaneous power measurements are made and this information is used to calculate the second count stop value. Alternatively, power usage can be continuously monitored. This embodiment allows a deeper discharge to occur since the actual power drawn by the load is known. Further, the processor can monitor the dept of discharge of the previous deep discharge, compare that with values stored in memory from laboratory measurements and other deep discharge events, and determine when the battery pack has decreased capability due to aging or other effects. The microprocessor can also alter the deep-discharge method in accordance to compensate for known aging effects. A maintenance signal can also be generated when battery pack capacity has decreased to a preset level to indicate that service or replacement may be required. This signal can be a warning light, or other signal, on the battery pack itself or a signal which is recognized by the charger unit and acted upon appropriately.

The design of controller 14 is somewhat different when used with the second embodiment of the deep discharge maintenance system 15. In particular, when counters or equivalent programmable functions determine that a large number of partial discharge/recharge cycles have occurred, which number is associated with occurrence of a memory effect, the controller produces a control signal which initiates a discharge of the battery to a known fully discharged state, approximately 0.9V/cell for NiCd, for example. The next time the battery is discharged, the memory effect is mitigated.

Preferably, several constraints are placed on the discharge. First, a deep-discharge is only initiated if it has been quite some time since the last normal discharge. For example, when the battery pack is used in an aircraft data recorder, it is preferable to only discharge the pack if the aircraft has been sitting idle for 3–4 hours, for example, like overnight. Second, in a preferred embodiment, the controller terminates deep-discharge immediately if power is re-applied to the system, such as would occur when an aircraft is being readied for flight. In addition, the controller preferably recognizes when a deep-discharge cycle is unsuccessful, e.g., as a result of either conditions 1) and 2), and then repeats the deep-discharge cycle at an appropriate time.

Particular embodiments of the function blocks in the capacitor pack 3 will now be discussed.

In a preferred embodiment, the capacitor pack 3 comprises a controller 19 and one or more buck/boost regulators 20, 21. When the capacitor voltage is near the load voltage, conventional switching or linear power supply circuits are used to convert the voltage being supplied to the capacitor pack from a normal battery charging voltage to the optimal charging voltage for the capacitor pack. Since the capacitor charges from 0V up to the full voltage, the charging voltage must also vary widely to prevent dissipating too much power in the charger. Conventionally, the buck/boost regulator includes a cascaded boost regulator and buck regulator, a single buck-boost regulator topology, or a forward converter. Any of these topologies are adequate for this application. A similar buck/boost regulator is used to convert the capacitor voltage back to the ideal load voltage.

When the capacitor voltage is much lower than the load voltage, only a buck converter is used to charge the capacitors. A boost converter is used to recover the energy in the capacitor and convert it to the proper load voltage. The circuits can be implemented using simple regulators.

When the capacitor voltage is much higher than the load voltage, only a boost converter is used to charge the capacitor. A buck converter is used to recover the energy in the capacitor and convert it to the proper load voltage. The circuits can be implemented using simple regulators.

The capacitor pack controller 19 comprises voltage and current measurement and limiting circuits. When charging power is applied, the controller sets one or more charging voltage setpoint values for the charging buck/boost regulator(s). The setpoint values may change over time as the capacitor becomes charged fully. The final setpoint voltage is the predetermined rated voltage of the capacitor pack (point of maximum energy storage).

According to a further aspect of the invention, circuitry is added to the energy packs 2, 3, to permit charging of non-optimal batteries or capacitors to a different voltage and convert the stored voltage back to an expected voltage. Preferably, the circuitry is contained within the energy pack. However, in an alternative embodiment it can be included in the charging unit itself. This additional circuitry permits the charger to charge optimal batteries or capacitors as reliably and inexpensively as possible yet also allows the basic system to work with other storage elements as they become developed.

Non-optimal storage elements are storage elements having voltage and charge combinations which do not lend themselves to operation at the desired output voltage and power level. For example, a small standard NiCd battery is the "AA" size rated at 600 mA-hr and 1.2 V. To build a 24V system, 20 of these batteries can be combined in series. The rated capacity of the pack would be 600 mA-hr. However, if the application called for only a 120 mA-hr life, for size, weight, or cost considerations, a non-optimal battery pack, comprised of 4 cells in series, for example, could be used instead. The 4 cells would nominally provide 4.8 V at 600 mA-hr. According to this aspect of the invention, the additional circuitry steps-up the battery output voltage 5 times to 24 V, reducing the overall capacity by a factor of 5 to the required 120 mA-hr output. The charging voltage, 28 V typically for a 24V system, would be stepped down to 6V, appropriate for a 4.8V battery pack.

According to yet another aspect of the invention, particularly useful for applications where the energy storage pack provides a known amount of energy to the load and the energy storage pack contains much more energy than that known amount to be supplied, is to perform a "deep discharge" wherein the charger selectively declines to charge the pack, instead of actively discharging it.

For example, a load requires an energy of 0.5 A-hr and the pack is rated at 5 A-hr. In a conventional system, each time the pack is charged and discharged by the load, the pack is only cycled to the 10% discharged point (0.5/5), or 90% of full charge. If the pack were a NiCd pack, then the memory effect would begin asserting itself after some tens of cycles. According to the invention, when it is determined that a deep-discharge of the pack is appropriate, e.g., in response to the operation of discrete circuitry or software, the charger could prevent the recharge of the pack for some number of charge-discharge cycles. As a result, the pack discharges to 90% on the first discharge, then 80% on the next discharge, since it is not being recharged, then 70%, and so on down to 20%, for example. At this point, the maintenance deep-discharge cycle is completed. The regular charging circuitry is then reactivated and the battery pack is fully recharged to 100%. Of course, the percentage of power drawn and thus the number of charge-suppressed discharge cycles will vary depending on the power capacity of the battery, the power requirements of the load, and the duration between charge cycles.

In particular implementations, power is drawn from the charger unit directly from the power units and the battery pack is used only as a backup power supply in the event that the main power fails. In one particular environment, typically used in power systems installed in commercial airlines, power is available form both 28 V DC mains and 120V AC mains. It would be advantageous to draw power from both of these sources to produce a regulated DC output for use in charging power packs and in powering other systems.

Figure 3:
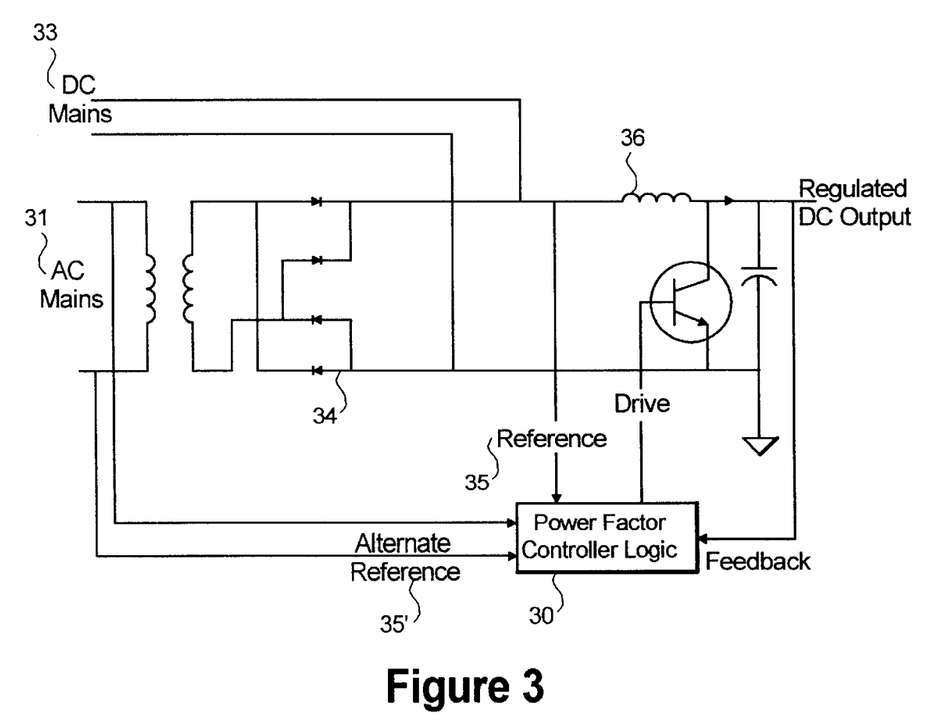
FIG. 3 is a circuit diagram of a power factor correction circuit.

A new power factor correction circuit for permitting this operation is shown in FIG. 3. Power factor correction circuits are often added to provide reduced current draw and distortion in power supplies. According to this aspect of the invention, the circuit has the capability to operate either from the AC mains 31 or a DC mains 33 (separate from the AC mains). The circuit configuration shown has the following characteristics:

1) Power Factor Correction ("PFC") circuit 30 is configured to operate on the rectified secondary side of a power transformer 32. In contrast, conventional PFC circuits operate on the primary power without a transformer.

2) The PFC circuit voltage reference is supplied from either the primary 35 or the secondary 35' of the transformer 32. In contrast, conventional PFC circuits use the input waveform (sinusoid or rectified sinusoid) as a reference. In the present embodiment, the PFC circuitry makes the input current follow a scaled version of the reference voltage. Using the secondary of the transformer is easier to implement but the primary is more accurate since the control system corrects for transformer distortion.

3) The PFC circuit boosts the secondary DC voltage up to the final (output) level. Conventional PFC circuits boost before the main regulator, so that the output of the PFC has to be converted again before it can be used.

4) DC Mains system 33, when available, can be connected into the rectified secondary side of the transformer 32. The PFC circuitry 30, 36 operates as a boost regulator, boosting the DC up to the required output level. Advantageously, only one boost regulator is needed, not two. If primary AC side sensing is used, additional circuitry is required to get DC reference. However, if secondary side sensing is used, no additional circuitry is required.

5) Using a transformer on the AC mains instead of using a switching regulator makes electromagnetic interference easier to deal with since the transformer can be shielded and leakage inductance can be added to smooth out the primary current.

While the invention has been particularly shown and described with reference to preferred embodiments thereof, it will be understood by those skilled in the art that various changes in form and details may be made therein without departing from the spirit and scope of the invention.

We claim:

1. A charging unit which provides controlled power to recharge at least one energy pack from a plurality of energy packs, comprising:

a charging circuit for receiving a input used to determine a type of said energy pack from said plurality of types of energy packs;

a charge controller circuit for controlling the operation of said charging circuit which provides controlled power to recharge said energy pack based on said type of energy pack; and an output control circuit for routing energy from said plurality of types of energy packs to an external connector.

2. A battery maintenance unit comprising:

a controller circuit, including:

a first counter which is incremented after each of a discharge and a charge of a battery;

a logic circuit for monitoring said first counter and for generating a discharge inhibit signal when said first counter equals a first predetermined number;

a discharge maintenance circuit for receiving said discharge input signal and for disabling charging of said battery upon receipt of said discharge input signal;

a second counter which is enabled by said logic circuit generating said discharge inhibit signal and which is incremented after each discharge of said battery; and when said second counter equals a second predetermined number, said discharge maintenance circuit further enabling charging of said battery, whereby deep discharge maintenance on said battery is performed automatically.

3. The battery maintenance unit of claim 2, further comprising:

a deep maintenance system for one of discharging a battery into a resistive load in response to a second input control signal and stopping the discharge when the voltage of said battery reaches a predetermined level.

4. The battery maintenance unit of claim 2, further comprising:

an enhancement unit including one of a first circuit to determine one of the duration from and a time stamp of one of a last deep discharge occurrence and a charge, a second circuit to indicate the duration of the time in service of an energy pack; and a third circuit to store an identification of said energy pack.

5. A battery charging unit, comprising a first external connector;

at least one power supply coupled to the external connector for converting input power from the first external connecter to predetermined voltage levels;

a logic circuit, a charging circuit and an output control, each respectively coupled to the at least one power supply; said logic circuit controlling operation of at least one of the charging circuit and the output control;

a type selector circuit coupled to the logic circuit; said type selector circuit receiving at least one input for determining a type of energy pack connected to the battery charging unit; and a second external connector coupled to at least one of the output control unit and the charging circuit for receiving a mating plug.

6. The battery charging unit of claim 5, said logic circuit comprising:

a counter; said counter being incremented after a discharge and a charge of an energy storage pack;

logic circuitry coupled to the counter; said logic circuitry monitoring said counter and generating a discharge inhibit signal when said first counter equals a first predetermined number;

a discharge maintenance circuit for receiving the discharge input signal and for disabling charging of the energy storage pack upon receipt of the discharge input signal; and a second counter which is enabled by the logic circuit and incremented after each discharge of the energy storage pack;

wherein when the second counter equals a second predetermined number, the discharge maintenance circuit enables charging of the energy storage pack.

7. The battery charging unit of claim 5, wherein the energy storage pack is a battery pack.

8. The battery charging unit of claim 7, wherein the battery pack comprises:

a mating plug having jumpers for providing identification of the battery pack;

a deep discharge maintenance system coupled to the mating plug; said deep discharge maintenance system one of discharges the battery pack into a resistive load in response to a second input control signal and stops the discharge when a voltage of the battery pack reaches a specific predetermined voltage;

a controller coupled to the deep discharge maintenance system; and a secondary battery coupled to the mating plug, the controller and the deep discharge maintenance system.

9. The battery charging unit of claim 8, wherein the deep discharge maintenance system comprises:

a transistor circuit which discharges the battery pack into a resistive load upon receipt of an input control signal, said transistor circuit stopping the discharge of the battery pack when the voltage of the battery reaches a predefined level.

10. The battery charging unit of claim 9, wherein the controller outputs the input control signal.

11. The battery charging unit of claim 8, wherein a discharge-inhibit signal is provided to the deep discharge maintenance system whenever the count equals the first predetermined number of cycles, the discharge-inhibit signal enables the second counter and disables subsequent increments of the first counter, and the counters are reset when the second counter reaches the second predetermined level.

12. The battery charging unit of claim 11, wherein the controller initiates a control signal to initiate a discharge of the battery to a known fully discharged state when the first counter and second counter determine that a large number of discharge/recharge cycles have occurred.

13. The battery charging unit of claim 12, wherein the know fully discharged state is approximately 0.9V/cell for NiCd.

14. The battery charging unit of claim 13, wherein if a large number of discharge/recharge cycles have occurred, a memory defect effect has occurred.

15. The battery charging unit of claim 14, the memory effect is part of an energy capacity of the battery is inaccessible during discharge.

16. The battery charging unit of claim 12, wherein the controller only initiates deep-discharge if an extended period has occurred between a last normal discharge.

17. The battery charging unit of claim 16, wherein the extended period is in a range of from 3 to 4 hours.

18. The battery charging unit of claim 12, wherein the controller terminates deep-discharge immediately if power is re-applied to an aircraft system.

19. The battery charging unit of claim 8, wherein the deep discharge maintenance system comprises:

a transistor circuit for selectively disabling recharge of the battery pack in response to an input signal.

20. The battery charging unit of claim 5, wherein the energy storage pack is a capacitor pack.

21. The battery charging unit of claim 20, wherein the capacitor pack comprises:

a mating plug having jumpers for providing identification of the capacitor pack;

at least one buck/boost regulator coupled to the mating plug;

a capacitor coupled to the mating plug and the at least one buck/boost regulator.

* * * * *